(12) United States Patent
Hu

(10) Patent No.: US 7,942,125 B2
(45) Date of Patent: May 17, 2011

(54) INTAKE AND EXHAUST SYSTEM OF INTERNAL COMBUSTION ENGINE

(76) Inventor: Chan Hoi Hu, Bucheon (KR)

(*) Notice: Subject to any disclaimer, the term of this patent is extended or adjusted under 35 U.S.C. 154(b) by 0 days.

(21) Appl. No.: 12/535,867

(22) Filed: Aug. 5, 2009

(65) Prior Publication Data

US 2010/0000206 A1     Jan. 7, 2010

Related U.S. Application Data

(62) Division of application No. 11/439,792, filed on May 24, 2006, now Pat. No. 7,588,007.

(30) Foreign Application Priority Data

Jun. 23, 2005   (KR) .................. 10-2005-0054465

(51) Int. Cl.
*F02M 35/10* (2006.01)
(52) U.S. Cl. ................................. 123/184.21
(58) Field of Classification Search ............ 60/294, 60/289, 290, 299, 305; 422/176, 177; 123/559.1, 123/184.21, 58.7, 531, 528, 521, 520, 502, 123/463, 454, 219
See application file for complete search history.

(56) References Cited

U.S. PATENT DOCUMENTS

| | | | |
|---|---|---|---|
| 3,020,901 A | | 2/1962 | Cook |
| 3,060,678 A | * | 10/1962 | Ridgway ................. 60/294 |
| 3,148,036 A | * | 9/1964 | De Palma ............... 422/176 |
| 3,659,415 A | | 5/1972 | Brenneke |
| 4,124,978 A | | 11/1978 | Wagner |
| 4,159,899 A | | 7/1979 | Deschenes |
| 4,555,937 A | | 12/1985 | Sumal |
| 4,739,651 A | | 4/1988 | Smith |
| 5,133,308 A | | 7/1992 | Hitomi et al. |
| 7,628,008 B2 | * | 12/2009 | Ranalli .................. 60/278 |
| 2008/0092645 A1 | | 4/2008 | Kanke |

* cited by examiner

*Primary Examiner* — Michael Cuff
*Assistant Examiner* — Keith Coleman
(74) *Attorney, Agent, or Firm* — Ladas & Parry LLP

(57) ABSTRACT

An exhaust system of the internal combustion engine is provided, which includes an exhaust manifold mounted in a multiple cylinder engine of the internal combustion engine and configured to expel air burned in the cylinder when an exhaust valve is opened, a plurality of exhaust pipes connected to the exhaust manifold and configured to dispense an exhaust gas to the outside, a muffler and a plurality of exhaust balancers configured to function as a condenser are selectively mounted in the exhaust system so as to fill a part of the exhaust gas inside and then re-exhaust the filled exhaust gas when the exhaust is completed. The exhaust system improves a power of the engine by lowering exhaust pressure generated from exhaust resistance than that of the cylinder.

2 Claims, 11 Drawing Sheets

INTAKE AND EXHAUST SYSTEM OF INTERNAL COMBUSTION ENGINE

CLAIM FOR PRIORITY

This is a divisional of copending application Ser. No. 11/439,792 filed on May 24, 2006, claims the benefit thereof and incorporates the same by reference.

This application is based on and claims priority to Korean Patent Application No. 10-2005-0054465 filed on Jun. 23, 2005 in the Korean Intellectual Property Office (KIPO), the entire contents of which are hereby incorporated by reference.

BACKGROUND

1. Field of the Invention

The present invention relates in general to the field of an intake and exhaust system of an internal combustion engine, and more particularly to an intake and exhaust system of an internal combustion engine that can achieve high-performance, high-power, low-vibration and an economical fuel consumption ratio by being engaged in proportion to engine load or a speed to supply a suction amount in standard quantity, dissipating pulsating energy inevitably generated during intake, reducing the exhaust resistance caused by interference with the exhaust gas during exhaust, and optimizing a fuel mixture ratio of the internal combustion engine.

2. Description of the Related Art

Generally, an intake and exhaust system sucks gases, which mix fuel with air, into a cylinder and discharges a combustion gas to the outside after the combustion of the mixed air.

The intake system mainly includes an air cleaner configured to remove a foreign substance such as dust from the intake air, a throttle valve configured to control a quantity of a sucked intake flow and an intake manifold configured to distribute mixed gases to respective cylinders. The exhaust system mainly includes an exhaust manifold configured to collect a combustion gas of the respective cylinders, and an exhaust pipe configured to discharge the combustion gas to the outside and a muffler.

Specially, the intake system may improve an engine's output by installing a variable intake system inside of the intake manifold so as to increase the suction efficiency according to engine load. This is a reason that the engine load/output is influenced if a quantity of mixed gases that is flowed to respective cylinders is unevenly supplied.

However, since the quantity of the intake flow is controlled by the throttle valve, the intake flow supplied at high speed reaches a pulsating state, i.e., a disproportion state of a pressure, resulting from either an intake resistance due to a pressure loss or an impact resistance due to an intake valve. This causes output deterioration of an engine and production of a noise, because new air is not sucked in sufficiently in proportion to the quantity of fuel. Moreover, the throttle valve is nearly closed during idling of the engine or partial load driving. At this time, a downstream side of the throttle valve is maintained in a high-degree vacuum state. This causes new air to be insufficiently sucked in, thereby deteriorating output of the engine. As a result thereof, environmental pollution is induced by incomplete combustion of exhaust gas.

Meanwhile, the exhaust system is gradually muffled by bringing on acoustic wave interference, a pressure change and a lower intake temperature while the exhaust gas passed through an exhaust pipe is passing through a multi muffler.

Specially, the exhaust process is smoothly performed, if a pressure in the cylinder is higher than that of the exhaust system in exhaust stroke. However, since exhaust pressure is higher than that of the cylinder due to exhaust resistance, if a high-performance muffler is applied so as to reduce the exhaust noise, the output of the engine is deteriorated.

SUMMARY

An object of the present invention is to provide an intake system, which can enable an intake flow to be normally flowed in proportion to a vast range of engine speeds and loads, and supply an intake flow as sufficient as the quantity in proportion to engine speeds and loads, to a plurality of cylinders, and an exhaust system of an internal combustion engine, which can improve an output of the engine by making exhaust pressure generated from an exhaust resistance lower than a pressure inside of the cylinder, even though a common muffler is applied.

According to an aspect of the present invention, there is provided an intake system of an internal combustion engine mounted in a multi cylinder engine of the internal combustion engine for operating the engine after sucking air for combustion when an intake valve is opened, comprising an air intake configured to suck atmospheric air in a swirl from, an intake manifold configured to equalize a dispensing pressure of the intake air supplied through the air intake and supply the equalized air to an intake port formed in one side of the engine, the manifold being formed while inclining at a desired angel, a plurality of suction chambers that are extended upwardly after being connected to the intake port of the engine, and in which a conduit line is formed, and configured to supply the equalized intake air to the intake port by enabling the intake manifold to be communicated with the conduit line and to flow reversely the intake air deflected by the closing of the exhaust valve along the upwardly extended conduit line, and a plurality of suction balancers configured to fill the intake air flowed reversely through the plurality of suction chambers and dispense the filled intake air by a flow speed of the intake air that is supplied through the intake manifold when the intake valve is re-opened.

Suction pipes are communicated with each other between the air intake and the intake manifold.

A throttle valve may be selectively mounted between the air intake and the suction pipe.

The suction balancer in which the reversely flowed intake air is filled is communicated with the other side of the suction pipe on the same shaft.

The suction chamber is formed between the suction pipe and the suction balancer so as to suck and mix the reversely flowed intake air filled in the suction balancer, when the intake air supplied through the air intake flows into the cylinder through the suction pipe.

The intake manifold further includes a surge tank that flows the normally supplied intake air and the reversely flowed intake air at a uniform pressure.

The number of suction chambers or suction balancers is equal to or greater than the number of cylinders of the engine.

The suction balancers are respectively communicated with each other by means of a balance tube configured to distribute the intake air that is reversely flowed by a uniform quantity.

According to an aspect of the present invention, there is provided an exhaust system, comprising an exhaust manifold mounted in a multiple cylinder of an internal combustion engine for exhausting air that is burned in the cylinder when an exhaust valve is opened, a plurality of exhaust pipes connected to the exhaust manifold for dispensing an exhaust gas to the outside and a muffler, wherein a plurality of exhaust balancers configured to function as a condenser are selectively mounted in the exhaust system, fill a part of the exhaust gas inside and then re-exhaust the filled exhaust gas when the exhaust is completed.

An orifice tube is installed between an inlet or an outlet of the muffler so as to enable a part of the exhaust gas to be passed through and increase exhaust speed of the exhaust gas for passing through the muffler depending on a flow speed of the exhaust gas that passes through the orifice tube.

The present invention will not be limited to the technical objects described above. Other objects not described herein will be more definitely understood by those skilled in the art from the following detailed description.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION OF EXEMPLARY EMBODIMENTS

Figure 1:
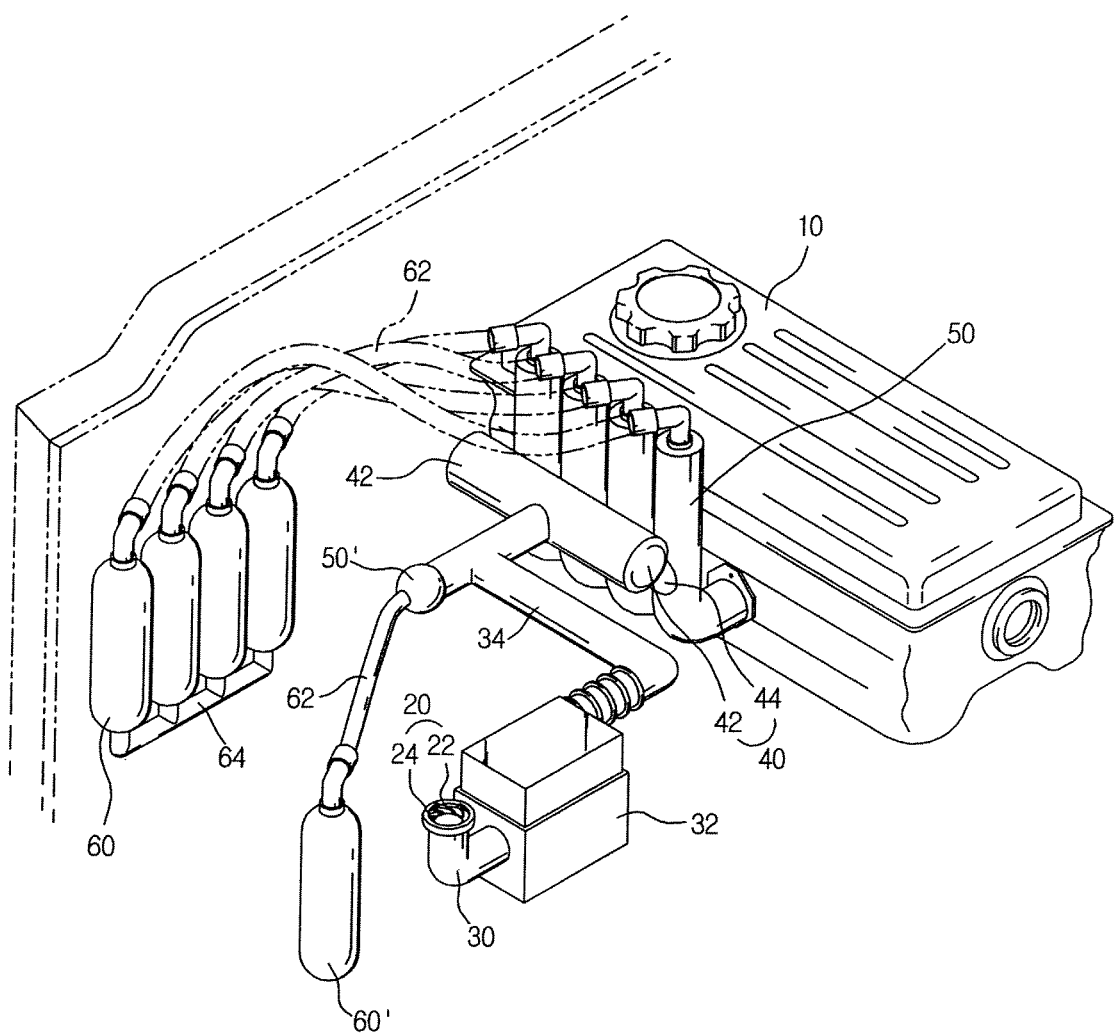
FIG. 1 is a perspective diagram illustrating an intake system of an internal combustion engine mounted in an engine according to an exemplary embodiment of the present invention.

Subject matters and features of the exemplary embodiments of the present invention will be covered by the detailed description and drawings.

Advantages and features of the present invention and methods of accomplishing the same may be understood more readily by reference to the following detailed description of the exemplary embodiments and the accompanying drawing. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, preferred embodiments of the present invention will be described in detail with reference to the accompanying drawing.

Figure 2:
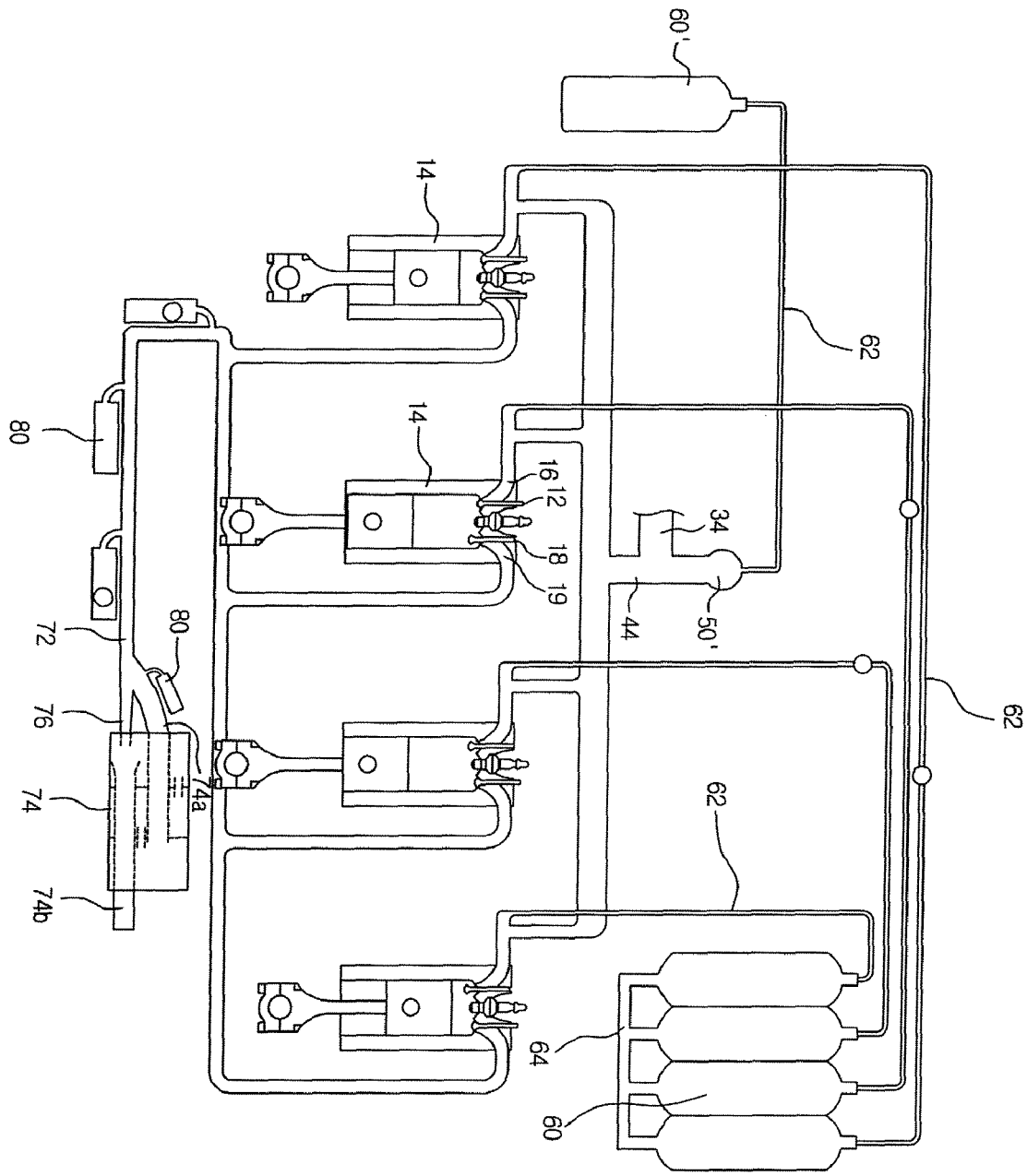
FIG. 2 is a schematic conceptual diagram illustrating an intake and exhaust system of the internal combustion engine mounted to the engine according to an exemplary embodiment of the present invention.
Figure 3:
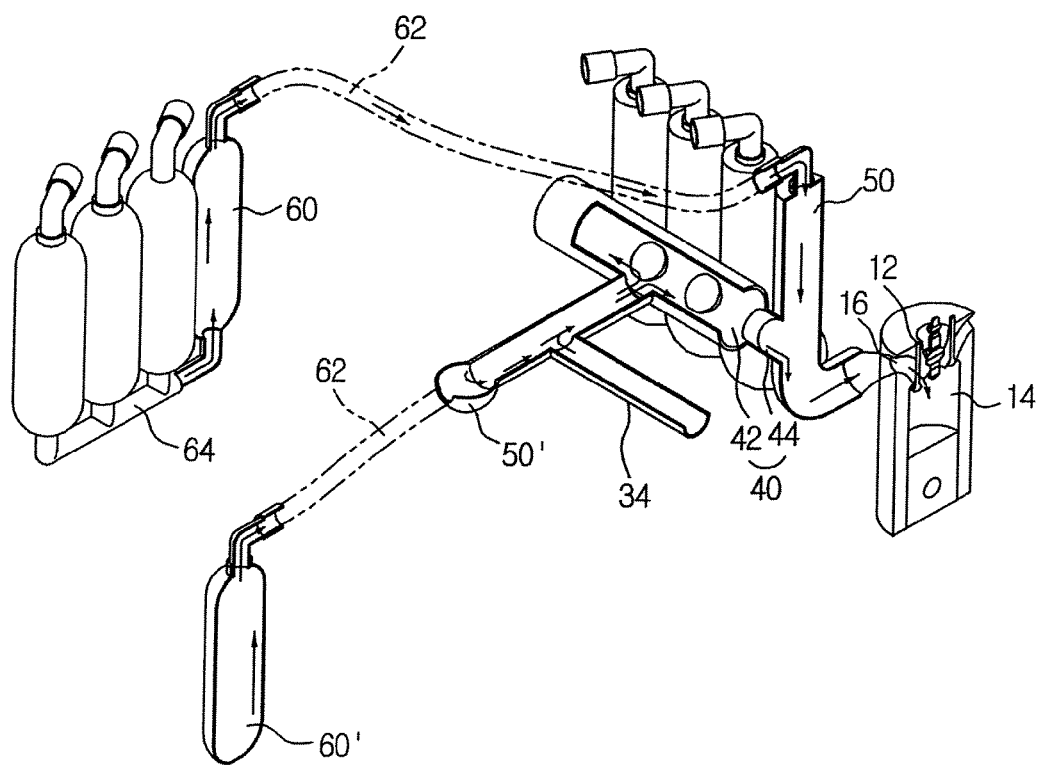
FIG. 3 is a schematic operational diagram illustrating a process where air sucked by the intake system is supplied to a cylinder of the engine according to the present invention.
Figure 4:
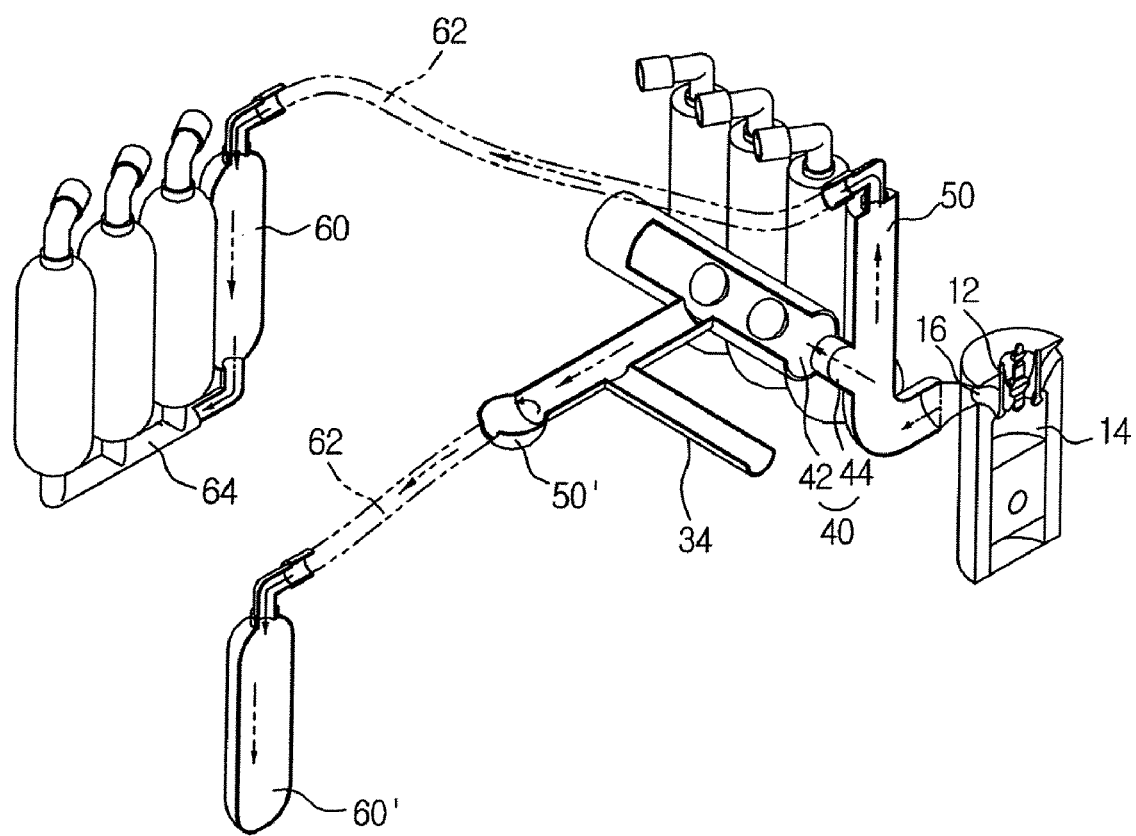
FIG. 4 is a schematic operational diagram illustrating a state in which the intake air after intake stroke is filled in a suction balancer.

FIG. 1 is a perspective diagram illustrating an intake system of an internal combustion engine mounted in an engine according to an exemplary embodiment of the present invention, FIG. 2 is a schematic conceptual diagram illustrating the intake system of the internal combustion engine mounted in the engine according to an exemplary embodiment of the present invention, FIG. 3 is a schematic operational diagram illustrating a process where air sucked by the intake system is supplied to a cylinder of the engine according to the present invention, and FIG. 4 is a schematic operational diagram illustrating a state in which the intake air, after intake stroke, is filled in the suction balancer.

As shown in FIG. 1 or 2, the intake system of the internal combustion engine, according to the present invention, operates an engine 10 after sucking air for combustion into a cylinder 14, when an intake valve 12 mounted in the multiple cylinder engine 10 of the internal combustion engine is opened.

The engine 10 is a device for generating an output by burning a fuel. The engine 10 according to the present invention includes both a diesel and a gasoline engine. In order for the intake system to supply air for combustion to the engine 10, an air intake 20 for sucking atmospheric air in a swirl from is mounted to a leading end of a suction pipe 30.

In order to reduce harmful components of an exhaust gas through rotation flow and obtain low fuel consumption ratio, high performance and high output, the air intake 20 induces atmospheric air in a swirl from in order to achieve complete combustion of air sucked into the cylinder 14 of the engine 10, and is formed in a spiral structure for minimizing an air resistance produced by the swirl state. The spiral structure includes a plurality of wings 22 that are formed in a spiral structure along the circumference of the suction pipe 30, and a frame 24 that fixes the wings 22 on a central shaft and is combined with the suction pipe 30.

An air cleaner 32 removes both foreign substances in air that are sucked in swirl form and intake noises generated during the intake.

An intake pipe 34 leads the intake air, from which the foreign substances are removed, to the engine 10, and a throttle valve (not shown) may be selectively mounted in the intake pipe 34.

Meanwhile, the reason why the throttle valve is not shown is that the throttle valve may be applied or not, according to characteristics of an engine and used fuels.

An intake manifold 40 is communicated with the intake pipe 34 and composed of a surge tank 42 and an intake manifold 44.

A surface of the surge tank 42 is smoothly processed so as not to enable the supplied intake air to meet with resistance and supply resistance to surrounding air. The surge tank 42 stores the intake air temporarily and then discharges the air at a uniform pressure.

The intake manifold 44 distributes the intake air, which is discharged at the uniform pressure by means of the surge tank 42, into the cylinder 14. The number of the intake manifold 44 is equal to or greater than the number of cylinder 14 depending on characteristics of the engine 10. The intake manifold 44 is inclined downwardly at a uniform angle.

The intake manifold 40 according to the present invention is not directly connected to the intake port 16 of the engine 10, differently from a common intake manifold, and extended upwardly after being connected to the intake port 16 of the engine 10. The intake manifold 40 is communicated with a first suction chamber 50 in which a conduit line is formed.

The first suction chamber 50 is communicated with the intake manifold 44 and supplies the equalized intake air to the intake port 16.

The conduit line functions as a chamber configured to temporarily store intake air, and re-accepts intake air that is flowed reversely by closing the intake valve 12 after intake stroke.

As described above, the intake chamber 50, which uniformly forms the conduit line inside of the first chamber 50 and functions as a chamber, is connected to a first suction balancer 60 through a tube 62.

The first suction balancer 60, in which a filling space is formed so as to fill the reversely flowed intake air through the first suction chamber 50, are connected to each other by means of a balance tube 64. The balance tube 64 is for supplying the intake air uniformly to a plurality of first suction balancers 60.

Meanwhile, the intake air filled in the balance tube 64 is discharged by a flow speed of the intake air that is supplied through the intake manifold 44 when the intake valve 12 is re-opened and then supplied to the cylinder 14.

At this time, the intake manifold 44 communicated with the first suction chamber 50 determines a flow speed of the intake air that is newly sucked according to the communicated angle (desirably, 1 to 90 degrees, and more desirably, 45 degrees). However, its operation will be explained later.

A second suction chamber 50' and a second suction balancer 60', all of which are communicated with the intake pipe 34, play the same role as described above. However, the second suction chamber 50' mixes newly intake air, which is newly supplied from outside, with the reversely flowed intake air. The mixed air is supplied to the intake manifold 40 by the flow speed of the newly supplied intake air. This will be explained in more detail below.

The intake pipe 34 is communicated with the surge tank 42 in a horizontal direction, so that an orifice principle can be desirably applied. The surge tank 42 forms an end that is extended to a length direction. The intake pipe 34 crossed at a right angle is communicated with the air cleaner 32. The second suction chamber 50' and the suction balancer 60' are communicated with the surge tank 42 via a tube 62.

As described above, the intake pipe 34, communicated with the air cleaner 32, functions as a conduit line for supplying newly flowed intake air. The newly flowed intake air is temporarily stopped in the second suction chamber 50' formed on the end and then flowed along the intake pipe 34 together with air filled in the second section balancer 60'.

Specifically, a shape of the second suction chamber 50' is different from that of the first suction chamber 50. However, their operation is the same, except that the second suction chamber 50' additionally performs an operation for mixing intake air filled in the second suction balancer 60' with intake air supplied through the intake pipe 34, and then re-supplies the mixed intake air to the intake manifold 40.

Next, the operation of the intake system will be explained with reference to FIG. 3 or 4.

First, as shown in FIGS. 1 and 3, a process is explained where air sucked by the intake system according to the present invention is supplied to a cylinder of an engine.

If the engine 10 is operated, the intake valve 12 is opened for combustion, and simultaneously atmospheric air is sucked into the air intake 20 and supplied to the cylinder 14 after passing through the air cleaner 32, the suction pipe 34, the intake manifold 40 and the first suction chamber 50 in order.

As shown in FIGS. 1 and 4, the intake valve 12 is closed for performing common explosion stroke. At this time, the intake air supplied by the process flows reversely simultaneously when closing the intake valve 12.

The reversely flowed intake air is collided with an internal wall of the first suction chamber 50, and the collided intake air is filled in the first suction balancer 60 after advancing at a angle deflected by the collision and flowing into the inside of the first suction chamber 50.

At this time, since the intake manifold 44 is communicated with the first suction chamber 50 at a desirable angle of inclination, the collided intake air does not flow reversely into the intake manifold 44, and thus the pulsation phenomenon is not generated.

The intake air reversely flowed in the intake manifold 44 advances to the second suction chamber 50' extended to a length direction and is filled in the second suction balancer 60' again.

If the intake valve 12 is opened, newly supplied intake air is mixed with the filled intake air and the mixed air is sucked into the cylinder 14, thus resulting in supplying the intake air in proportion to the speed of the engine 10.

Figure 5:
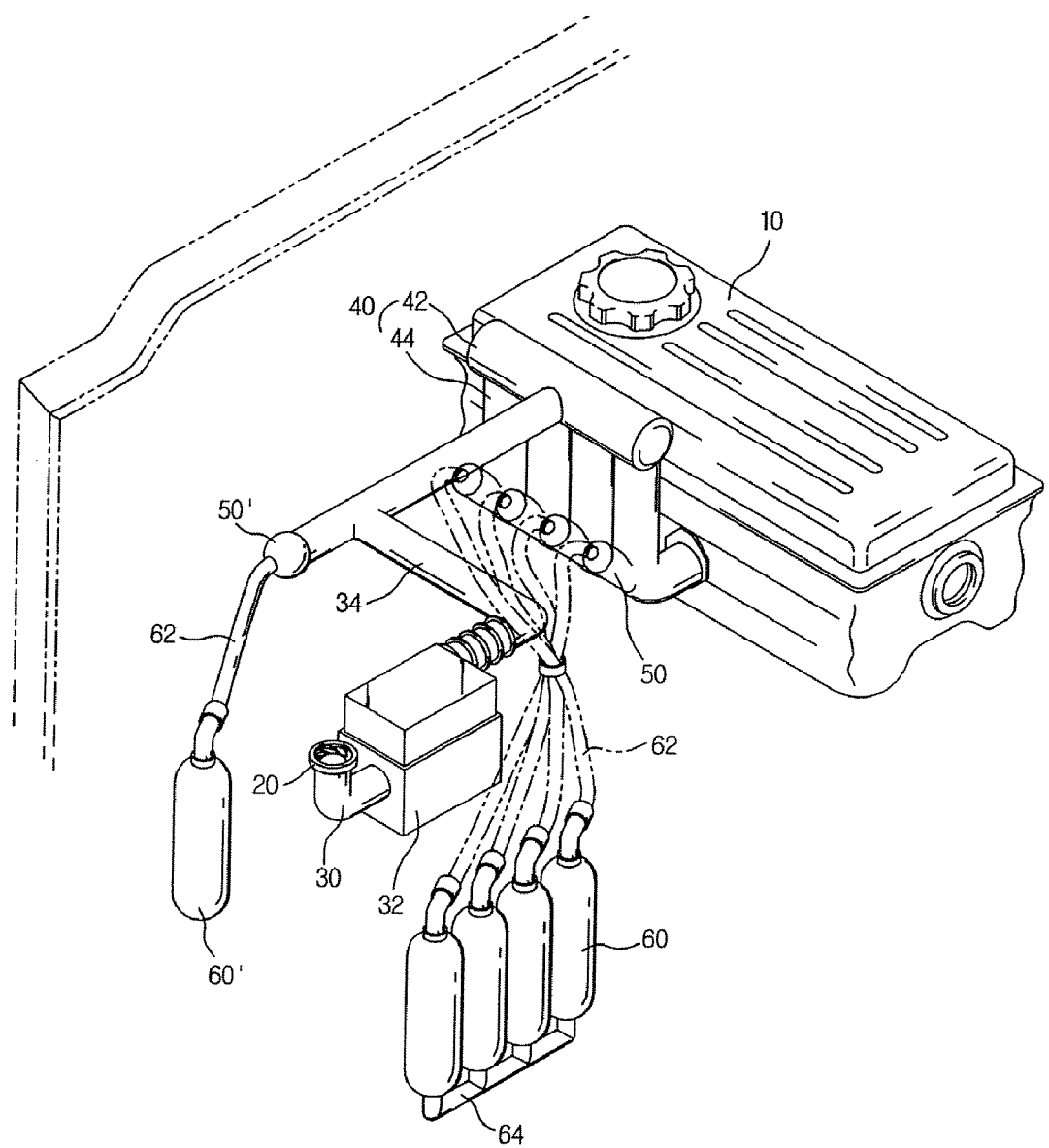
FIG. 5 is a perspective diagram illustrating the intake system of the internal combustion engine mounted to the engine according another exemplary embodiment of the present invention.

FIG. 5 is a schematic conceptual diagram illustrating an intake system of an internal combustion engine which is mounted to an engine according to another exemplary embodiment of the present invention. It is shown that shapes of various intake systems are changed.

The suction pipe 34 and the intake manifold 40 are communicated with each other in the same structure as the above-described exemplary embodiment. However, the intake manifold 44 of the intake manifold 40 is directly communicated with the engine 10 and the first suction chamber 50 is communicated with the intake manifold 44 at a uniform inclination angle.

This is a structure where the intake air reversely flowed through the intake manifold 44 is reversely flowed directly into the first suction chamber 50. It is understood that an angle of the first suction chamber 50 may be variously changed and executed according to an installation position of the intake manifold 44.

Figure 6:
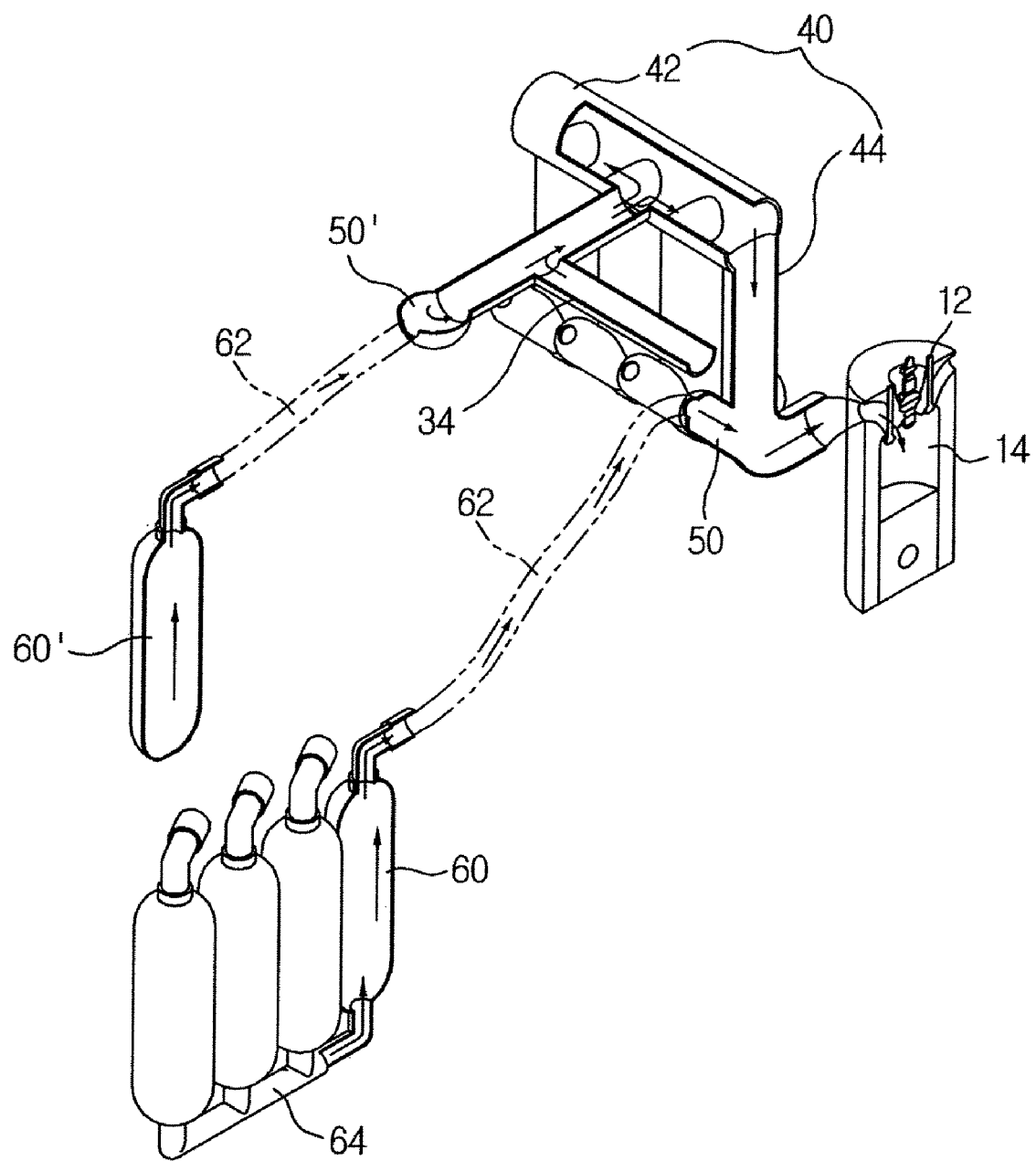
FIG. 6 is a schematic operational diagram illustrating a process that air sucked by the intake system is supplied to a cylinder of the engine according to another exemplary embodiment of the presenting invention.
Figure 7:
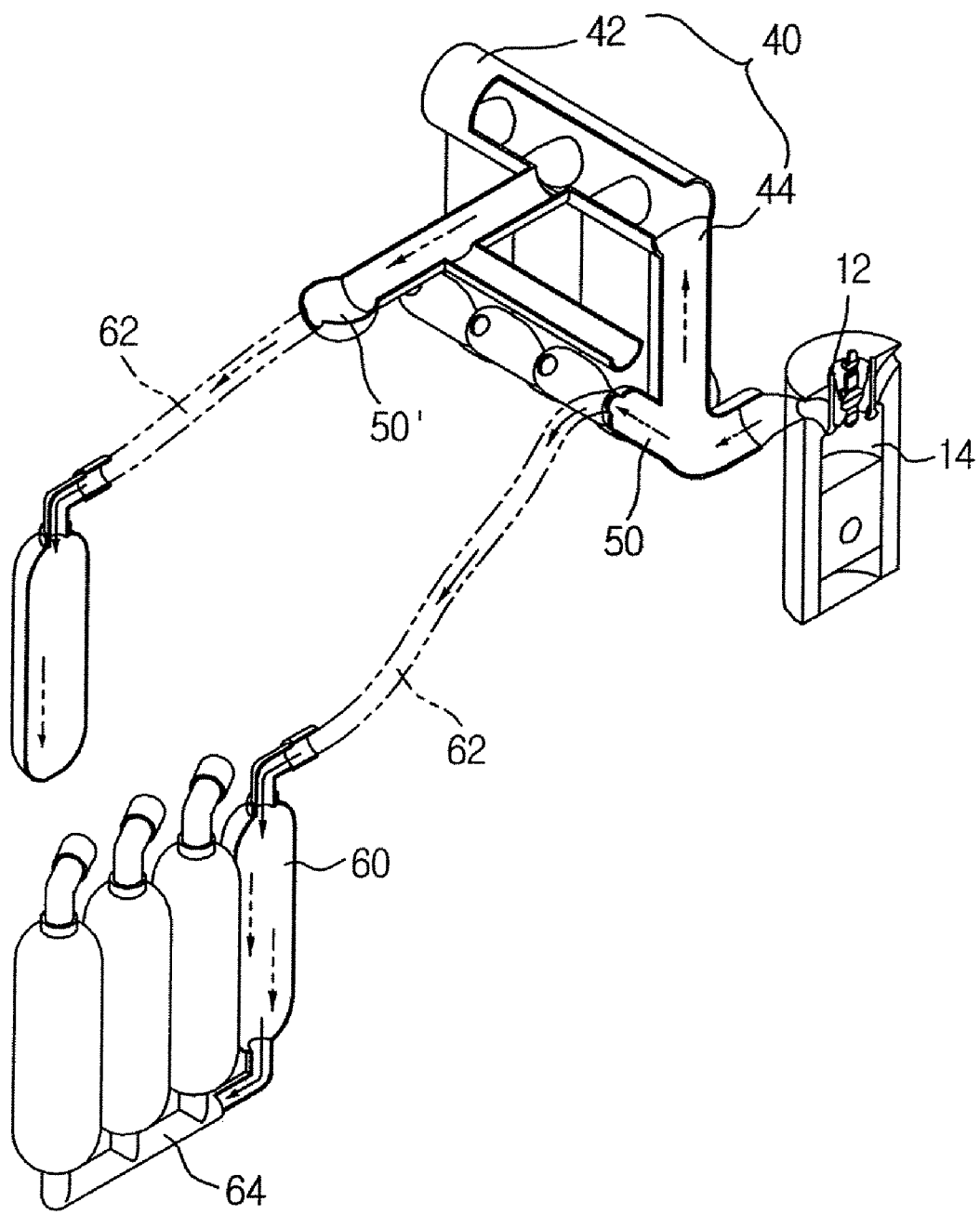
FIG. 7 is a schematic operational diagram illustrating a state in which intake air after intake stroke is filled in the section balancer according to another exemplary embodiment of the present invention.

FIG. 6 is a schematic operational diagram illustrating a process that air sucked by the intake system according to another exemplary embodiment of the present invention is supplied to the cylinder of the engine, and FIG. 7 is a schematic operational diagram illustrating a state in which the intake air after intake stroke is filled in the suction balancer according to another exemplary embodiment of the present invention.

As shown in FIGS. 6 and 7, when the engine 10 is operated, the intake valve 12 is opened for combustion, and simultaneously atmospheric air is sucked into the air intake 20 and supplied to the cylinder 14, after passing through in order of air cleaner 32, the suction pipe 34 and the intake manifold 44 of the intake manifold 40.

The intake valve 12 is closed for performing an explosion stroke. At this time, the intake air supplied by the above described process begins reversely flowing simultaneously when the intake valve 12 closes.

At this time, the reversely flowed intake air flows reversely along the intake manifold 44, is sucked in the first suction chamber 50 formed on the intake manifold 44 at a desired inclination angel, flows into the first suction chamber 50, and then is filled into the suction balancer 60 along the tube 62.

At this time, since the intake manifold 44 and the first suction chamber 50 are communicated at a desirable angle of inclination, the reversely flowed intake air is directly sucked in the first suction chamber 50 at a reverse flow velocity which is in proportion to the speed of the engine 10, so that the common pulsating phenomenon generated from a boundary between the intake manifold 44 and the first suction chamber 50 is not generated.

Meanwhile, the intake air that is reversely flowed in the intake manifold 44 advances to the second suction chamber 50' extended in a lengthwise direction and is again filled in the second suction balancer 60', thereby resulting in performing the same operation as the above described exemplary embodiment.

The exhaust system from which an exhaust gas is expelled after the explosion will be now explained.

Figure 8:
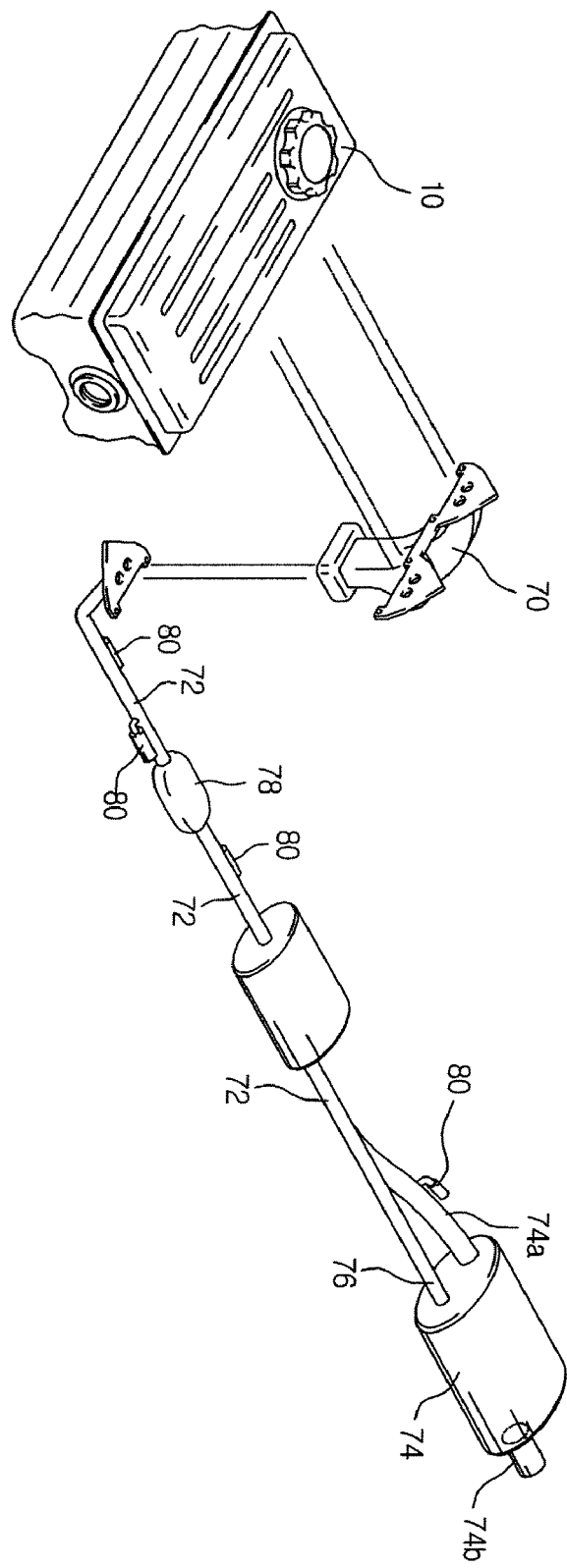
FIG. 8 is a perspective diagram schematically illustrating the exhaust system of the internal combustion engine mounted to the engine according to an exemplary embodiment of the present invention.
Figure 9:
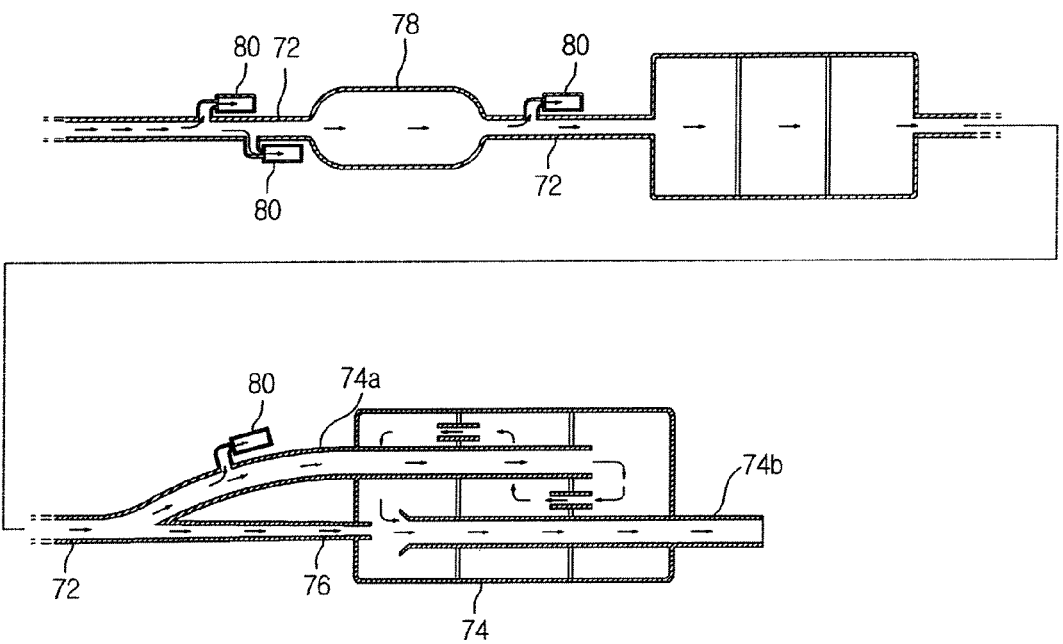
FIG. 9 is a state diagram illustrating a state in which an expelled exhaust gas, after the combustion, is expelled through the exhaust system after being filled in the exhaust balancer according to an exemplary embodiment of the present invention.
Figure 10:
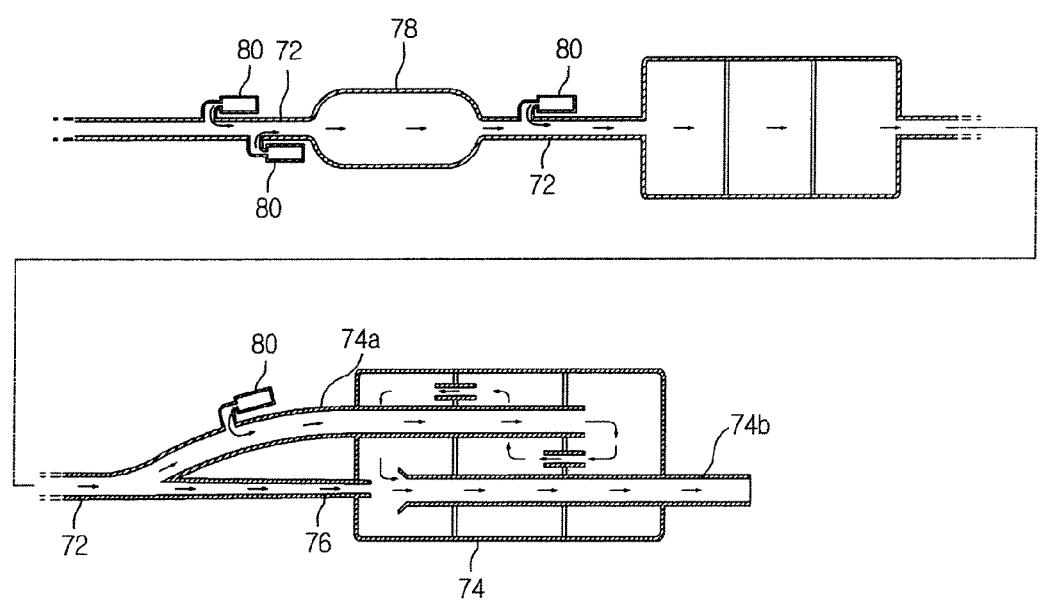
FIG. 10 is a state diagram illustrating a state in which the exhaust gas filled in the exhaust balancer is expelled through the exhaust system, after the exhaust valve is closed, according to an exemplary embodiment of the present invention.

FIG. 8 is a perspective diagram schematically illustrating the exhaust system of the internal combustion engine mounted to the engine according to an exemplary embodiment of the present invention, FIG. 9 is a state diagram illustrating a state in which an expelled exhaust gas, after the combustion, is expelled through the exhaust system after being filled in the exhaust balancer according to an exemplary embodiment of the present invention, and FIG. 10 is a state diagram illustrating a state in which the exhaust gas filled in the exhaust balancer is expelled through the exhaust system, after the exhaust valve is closed, according to an exemplary embodiment of the present invention.

As shown in FIGS. 2 and 8, the exhaust system according to the present invention is mounted in the multiple cylinder engine 10 of the internal combustion engine and includes an exhaust manifold 70 for expelling air that is burned in the cylinder 14 when an exhaust valve 18 is opened, a plurality of exhaust pipes 72 connected to the exhaust manifold 70 for expelling the exhaust gas to the outside, and a muffler 74.

In the exhaust system, one or more exhaust balancers 80 configured to function as a condenser are selectively mounted so as to be filled with a part of the exhaust gas, and re-exhaust the exhaust gas filled therein when the exhaust process has been completed. An orifice pipe 76 is installed between inlets 74a and outlets 74b of the muffler 74 so that a part of the exhaust gas is passed through.

This increases the exhaust speed of the exhaust gas that passes through the muffler 74, due to a fast exhaust flow speed of the exhaust gas that passes through the orifice pipe 76.

Meanwhile, since at least one or more exhaust balancers 80 are installed on the orifice pipe 76, the exhaust of the exhaust gas may be more quickly performed.

The operation of the exhaust system with this configuration will be explained as follows.

As shown in FIGS. 2, 9 and 10, the gas that is burned in the cylinder 14 is rapidly expelled through the opened exhaust valve 18 and the exhaust port 19 during the exhaust stroke, i.e., after the expansion stroke for generating power. At this time, the exhaust gas is collected by the exhaust manifold 70 and then expelled into the air after passing through a catalytic converter 78 and the muffler 74 through the exhaust pipe 72.

A part of the exhaust gas is flowed into a plurality of exhaust balancers 80 installed on the exhaust pipe, and a part of other exhaust gas passes through the orifice tube 76 of which respective ends are connected to both a front end and a rear end of the muffler 74. The part of the exhaust gas for passing through the orifice tube 76 is flowed to and held in the exhaust balancer 80 that is installed on an inlet side or an outlet side of the muffler 74.

Likewise, the exhaust gas stored in the exhaust balancer 80 during the exhaust stroke is expelled by a pressure difference resulting from rapid decrease of the exhaust pressure in the exhaust pipe 72 when the exhaust stroke is completed, and maintains a continuous flow of the exhaust gas, while a very high-speed gas flow is generated in a connection unit between the orifice tube 76 and the exhaust pipe 72. The high-speed fluid flow decreases pressure in the connection part due to the orifice effect, and thus, the exhaust gas for passing through the muffler 74 may be strongly sucked in and expelled.

Further, since the flow of the exhaust gas in the orifice tube 76 is continuously led by a pressure difference of the exhaust balancer 80 installed on the orifice tube 76, the remaining exhaust gas that has been left in the muffler 74 may be effectively expelled.

Figure 11:
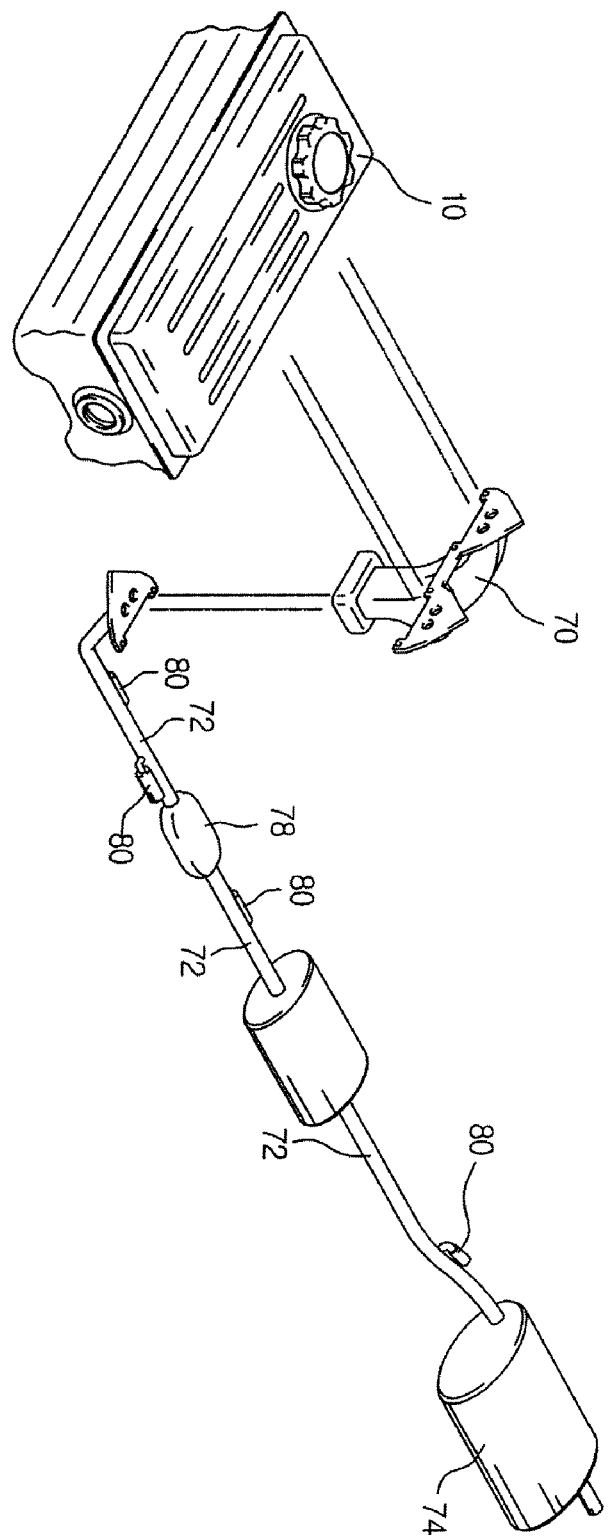
FIG. 11 is a perspective diagram schematically illustrating the exhaust system of the internal combustion engine mounted in an engine according to another exemplary embodiment of the present invention.
Figure 12:
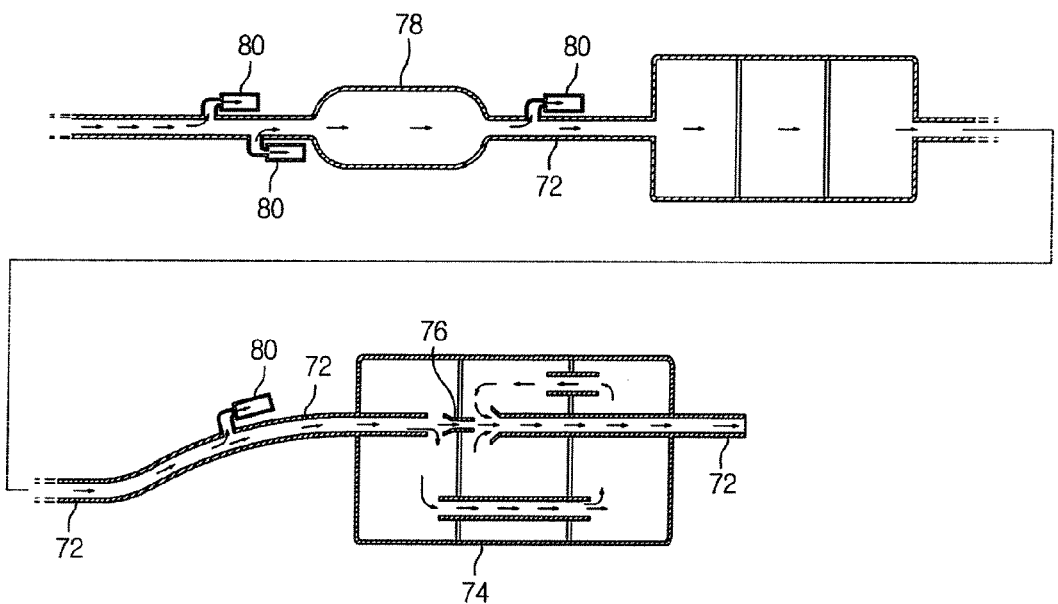
FIG. 12 is a state diagram illustrating a state in which an expelled exhaust gas, after the combustion, is expelled through the exhaust system after being filled in the exhaust balancer according to another exemplary embodiment of the present invention.
Figure 13:
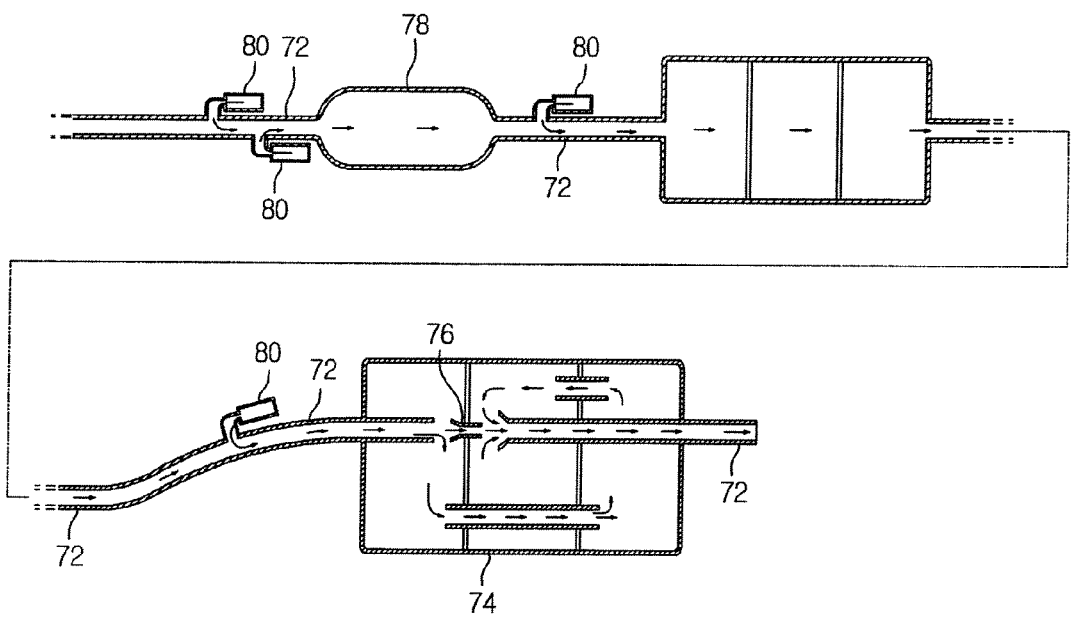
FIG. 13 is a state diagram illustrating a state in which the exhaust gas that has filled in the exhaust balancer is expelled through the exhaust system, after the exhaust valve is closed, according to another exemplary embodiment of the present invention.

FIG. 11 is a perspective diagram schematically illustrating the exhaust system of the internal combustion engine mounted in an engine according to another exemplary embodiment of the present invention, FIG. 12 is a state diagram illustrating a state in which an expelled exhaust gas, after the combustion, is expelled through the exhaust system after being filled in the exhaust balancer according to another exemplary embodiment of the present invention; and FIG. 13 is a state diagram illustrating a state in which the exhaust gas that has filled in the exhaust balancer is expelled through the exhaust system, after the exhaust valve is closed, according to another exemplary embodiment of the present invention.

FIGS. 11, 12 and 13 are another exemplary embodiment of the above described orifice tube 76, wherein the orifice tube 76 is mounted on inside of the muffler 74.

In other words, when passing through the inside of the muffler 74, the exhaust gas produces a pressure difference by passing through the orifice tube 76 at a high speed. This pressure difference causes the exhaust gas for passing at low speed inside of the muffler 74 around the end of the orifice tube 76 to be expelled, thereby maintaining the flow of the exhaust gas, continuously.

According to the above configuration and operation, intake air which is in proportion to the rotation speed of the engine 10 may be supplied, and the combusted air may be rapidly expelled, thereby improving the performance of the engine 10.

As described above, the present invention includes the suction balancers 60 and 60' and exhaust balancer 80, each of which can temporarily store the sucked and exhaust gas, thereby improving an output deterioration of the engine 10 caused by the discharge pressure of the exhaust gas and the shortage of intake air that may be generated at high or low speed.

The term "engine" is used in the widest range of meaning, in other words, widely designated as an internal combustion engine including all engines for performing intake and exhaust, and is not be limited to the engine 10 as shown above.

As described above, the intake and exhaust system of the internal combustion engine according to the present invention, includes the intake system configured to supply an intake flow enough to be proportional to an engine speed and load to a plurality of cylinders and the exhaust system configured to improve the power of the engine by lowering the exhaust pressure generated by the exhaust resistance than that of the cylinder, even though the common muffler is applied, thereby allowing high-performance, high-power, low-vibration and economical fuel efficiency to be provided and preventing environmental pollution caused by the combustion efficiency.

It should be understood by those of ordinary skill in the art that various replacements, modifications and changes in the form and details may be made therein without departing from the sprit and scope of the present invention as defined by the following claims. Therefore, it is to be appreciated that the above described embodiments are for purpose of illustration only and are not to be construed as limitations of the invention.

The invention claimed is:

1. An air intake and exhaust system for supplying intake air to a cylinder of an internal combustion engine and expelling an exhaust gas from the cylinder, wherein the intake air is sucked through an air cleaner and led into an intake port of the engine by an intake pipe upon opening of an intake valve, the air intake and exhaust system comprising:

an air intake including a plurality of wings for swirling intake air at a suction pipe and a frame for securing wings on the suction pipe;

an intake manifold including a surge tank and communicating between the intake pipe and the intake port of the engine so as to equalize a discharge pressure of the intake air that is passed through the air cleaner and supplies the equalized air to the intake port of the engine, the intake manifold being inclined at a desired angle;

first suction chambers that form a plurality of equalized air chambers extending separately from the intake manifold, the first suction chambers being connected between the intake manifold and the intake port of the engine upwardly at a predetermined inclination angle about the intake manifold, configured to supply the equalized air to the intake port by enabling the intake manifold to be communicated with the qualized air chambers and enable the intake air deflected by the closing of the intake valve to be reversely flowed along the upwardly extended equalized air chambers;

first suction balancers which are connected to the first suction chambers and configured to fill the intake air that flows reversely through the first suction chambers and dispense the filled intake air by a flow speed of the intake air supplied through the intake manifold, when the intake valve is re-opened;

a second suction chamber which is connected to the intake pipe and is communicated between the surge tank of the manifold and air cleaner, so that the second chamber enables the reversely flowed intake air to be filled in the second suction balancer and mixed with the intake air newly supplied through the air intake and passed through the air cleaner;

a second suction balancer which is connected to the second suction chamber via a tube so as to communicate the mixed air of the second suction chamber with the surge tank;

an exhaust manifold, mounted to the engine and configured to expel air burned in the cylinder, when an exhaust valve is opened;

a plurality of exhaust pipes, connected to the exhaust manifold, configured to dispense an exhaust gas;

a muffler;

an orifice tube arranged between an inlet and an outlet of the muffler so as to enable a part of the exhaust gas to be passed through the muffler depending on a flow speed of the exhaust gas that has passed through the orifice tube and increasing an exhaust speed of the exhaust gas; and a plurality of exhaust balancers connected to the orifice tube so as to fill a part of the exhaust gas inside and then re-exhaust the filled exhaust gas when the exhaust is completed.

2. An intake and exhaust system according to claim 1, wherein the orifice tube installed inside of the muffler passes through a part of the exhaust gas and increase an discharge speed of the exhaust gas for passing through the muffler by a flow speed of the exhaust gas that has passed through the orifice tube.

* * * * *